Sept. 30, 1969    B. H. SOFFER ET AL    3,470,492
REVERSIBLY BLEACHABLE DYE FOR USE WITH A GIANT PULSE LASER
Filed Sept. 9, 1964

INVENTORS
BERNARD H. SOFFER
RAYMOND H. HOSKINS

Elliott & Pastoriza
ATTORNEYS

United States Patent Office 3,470,492
Patented Sept. 30, 1969

3,470,492
REVERSIBLY BLEACHING DYE FOR USE WITH A GIANT PULSE LASER
Bernard H. Soffer, Northridge, and Raymond H. Hoskins, San Pedro, Calif., assignors to Union Carbide Corporation, a corporation of New York
Filed Sept. 9, 1964, Ser. No. 395,236
Int. Cl. H01s 3/20
U.S. Cl. 331—94.5                                4 Claims

ABSTRACT OF THE DISCLOSURE

A neodymium doped giant pulse laser providing monochromatic light of wave lengths within the range of 7,000 to 10,800 A. incorporates a reversibly bleachable dye selected from the family of cyanine polymethine dyes in a solution as a Q-switching medium for the generation of giant pulses. The preferred Q-switching dye solution constitutes 3,3′ - diethyl-9,11,15,17-dienopentylene-thiapentacarbocyanine iodide dissolved in quinoline.

---

Figure 1:
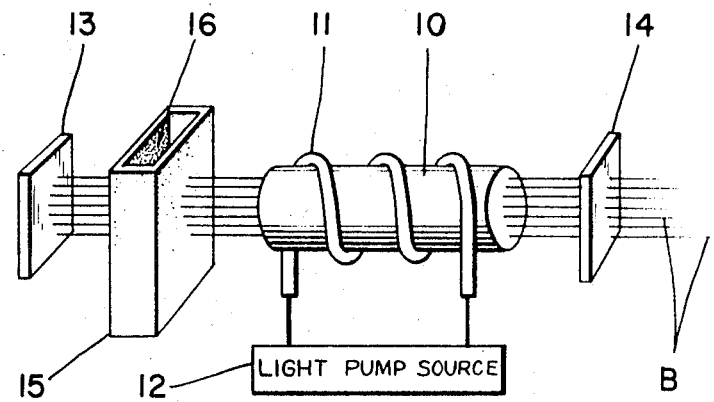

This invention relates generally to light control means incorporating a reversibly bleachable dye for switching the optical cavity Q in a giant pulse laser system.

While the preferred embodiment of the invention is in combination with a giant pulse laser device, the light control means itself, as a subcombination, may find wide application in other optical systems.

Certain known lasers comprise a host crystal doped with a primary additive providing the laser ions. Regeneration means in the form of reflective end coatings or mirrors are positioned at the ends of the crystal to define an optical cavity. Light energy is optically pumped into the crystal resulting in an inverted population between two energy levels of the laser ions. When a given threshold or inverted state is attained, a stimulated emission of radiation of light from the crystal will occur. This stimulated emission is effectively generated by light passing back and forth through the crystal in the optical cavity. The emitted light is of a frequency corresponding to the energy difference between the two energy levels.

The stimulated emission generated when the inverted population tends to return to its original state may be coupled out of the system by making one of the end coatings or mirrors partially reflective or alternatively, providing a small opening in one end mirror.

A giant pulse laser is similar to the conventional laser described above except that a light switch such as a Kerr or Pockels cell is incorporated in the optical cavity. This light control cell essentially lowers the Q of the optical cavity by blocking light to permit a much greater inverted population level to be achieved in the laser crystal before stimulated emission takes place. At a given time during the light pumping cycle, an external trigger changes the state of the cell to render it substantially transparent so that the Q of the optical cavity is restored. Since a considerably larger energy density may be built up in the laser from the light pump source before laser action can take place as a consequence of the Q-spoiling, when this energy is finally released upon triggering of the Kerr or Pockels cell, a giant pulse of radiation results.

In copending patent application Ser. No. 364,169, now U.S. Patent No. 3,418,599 filed May 1, 1964, and entitled Light Control Means for Use With a Giant Pulse Laser, there is disclosed a light control means in the form of a chemical substance adapted to be positioned in the optical cavity of a laser system. The principal and essential characteristic of this chemical substance is that it exhibits a high absorption cross-section at the laser frequency and that when the molecules and/or atoms of the substance are excited from a first energy level to a second energy level by the incident light from the laser system, the absorption decreases so that the substance becomes substantially transparent. In this respect, the time interval or "existence time" of the excited molecules or atoms in the second energy state is preferably longer than the width of the giant pulse process in order that a transference of a majority of the molecules or atoms to the excited state can take place. In other words, the incident light must be such as to "pump up" more of the molecules or atoms to the excited state than "fall back" to the unexcited state.

By using a chemical substance having the foregoing characteristics in the optical cavity of a giant pulse laser, laser action will be inhibited because of the high absorption of the substance in the absence of a sufficient amount of incident light of laser frequency thus providing a substantially opaque optical element in the optical cavity. The Q of the optical cavity is thus spoiled. As optical energy is continuously pumped into the laser crystal, however, there will be sufficient initial laser action to generate light resulting in the desired excitation of the molecules or atoms in the substance so that it tends towards transparency. The instant that the substance becomes less opaque or more transparent, the greater will be the Q of the optical cavity resulting in more incident laser light so that the process is regenerative, and in an extremely short time will result in a complete change in state of the chemical substance to a condition of transparency. At this point, a giant pulse will be released.

Upon cessation of the laser pulse, the chemical substance will resume its initial condition in which it is substantially opaque.

In the particular embodiment described in the foregoing co-pending patent application, the chemical substance constituted a reversibly bleachable organic dye in the form of a solution of kryptocyanine in methyl alcohol and was used with a ruby laser. A large absorption cross-section of the kryptocyanine is exhibited at the 6943 A. wave length radiation from the ruby laser. While this particular dye solution is effective at this and neighboring wave lengths such as result from other lasers in the ruby family, it is not useful for widely different wave length radiations such as exhibited by the neodymium doped laser group.

With the foregoing in mind, it is accordingly a primary object of this invention to provide a reversibly bleachable dye solution for use as a passive Q-switching or light control means in a giant pulse laser system in which the wave length of laser light is in the range of from 7000 to 10,800 A. such as emitted by neodymium doped lasers.

Briefly, this object is realized by employing a specific organic dye which exhibits a large absorption cross-section to laser radiation of wave lengths within the range from 7000 to 10,800 A. Preferably, the dye is dissolved in quinoline or a derivative thereof and incorporated in a cell in the optical cavity of a neodymium laser to effect Q-switching in a manner similar to that in the ruby laser system described in the above referred to copending application.

Figure 2:
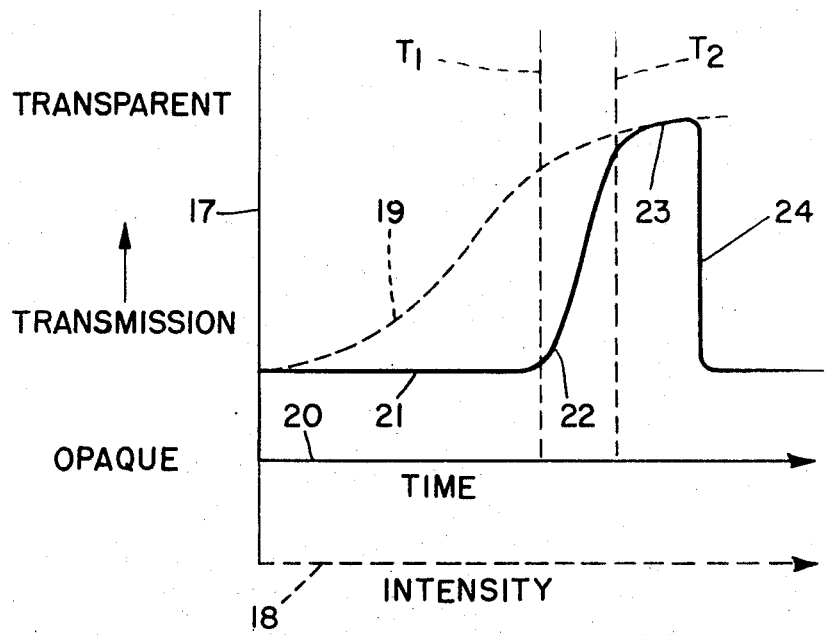

A better understanding of the invention will be had by now referring to the preferred embodiment thereof as illustrated in the accompanying drawings, in which:

FIGURE 1 is a highly schematic representation of a giant pulse laser device incorporating the light control means in accordance with the invention; and, FIGURE 2 is a qualitative plot illustrating characteristics of the light control means useful in explaining the operation of the device of FIGURE 1.

Referring first to FIGURE 1, there is shown a solid state laser rod 10 surrounded by a spiral flash lamp 11 powered from a suitable light pump source 12. Regenerative means in the form of end mirrors 13 and 14 respectively, are provided to define an optical cavity for the laser 10. In the particular example illustrated, these mirrors were 100% and 70% reflecting respectively. A light control means in accordance with the present example takes the form of a quartz cell 15 incorporating a reversibly bleachable organic dye in the family of the cyanine polymethine dyes dissolved in quinoline. The particular dye used is 3,3'-diethyl-9,11;15,17-dineopentyl-ene-thia-pentacarbocyanine iodide with a concentration of $4 \times 10^{15}$ molecules per cc. in quinoline in a cell 1 cm. in length. The chemical construction of this dye is described in detail in United States Patent No. 2,734,900.

In the particular example illustrated, the laser 10 constitutes a glass rod 2 inches long and ¼ inch in diameter doped with neodymium. The wave length of stimulated emission shown at B from this particular laser is 10,600 A. and at this wave length, the polymethine dye exhibits an absorption cross-section of $2.7 \times 10^{-16}$ cm.$^2$. The cell thus prevents any appreciable stimulated emission in the optical cavity from taking place during the initial light pumping of the laser.

In the absence of the light control cell 15, a threshold of approximately 850 joules results in ordinary laser action. With the light control cell in position in the optical cavity, an input energy of approximately 1800 joules is required to produce a giant laser pulse of approximately 1 megawatt peak power.

The manner in which the light control cell 15 of FIGURE 1 inhibits laser action until an extraordinarily high amount of energy is built up in the laser and the manner in which this energy is then released will be better understood by now referring to FIGURE 2.

In FIGURE 2 there is shown a graph in which the ordinate 17 qualitatively represents the degree of transmission or transparency of the organic dye in the cell 15 of FIGURE 1, and the lower abscissa in dashed lines 18 represents the degree of light intensity from a light source which may be varied linearly in intensity as distinct from the laser of FIGURE 1. The dashed curve 19 is plotted with respect to the ordinate 17 and abscissa 18 and qualitatively represents the degree of transparency of the cell 15 with respect to a uniformly varying light intensity from zero to a maximum value.

As shown, the cell will initially move towards transparency as the molecules in the solution become excited by incident light. The rate of change towards transparency is relatively slow at first and then increases to define a generally S-shaped curve which levels off towards the transparent condition.

The abscissa 20 represents time and the solid curve represents the change in transparency of the cell 15 when incorporated in the giant pulse laser system of FIGURE 1. In this case, the light intensity is not uniformly increased but rather, as the optical pumping means effects an inverted population level in the laser 10, there is essentially no light in the optical cavity. Thus, the cell remains substantially opaque as indicated by the initial horizontal portion 21 of the solid line curve. There will be a slight amount of light leakage which accounts for a slight slope on the line 21 towards transparency.

At a given time T1 when a considerable amount of energy has been absorbed by the laser crystal, a slight amount of laser action will be initiated. The cell 21 is not so opaque that some regeneration cannot commence between the end mirrors 13 and 14. This initial laser action will greatly increase any small amount of light incident upon the cell 15 with a result that there will be a rapid excitation of the molecules in the cell to a second energy level. As this second energy level increases in population, the cell becomes more transparent and this increased transparency immediately permits increased laser action in the optical cavity to thereby further increase the incident light. The combination of the cell and laser thus is regenerative in nature so that an extremely rapid switching from a substantially opaque to a substantially transparent condition in the cell results, as indicated at 22 and 23 and between the times T1 and T2.

When the molecules in the cell are "bleached" or substantially in the excited energy level, the stimulated emission of radiation effected in the optical cavity can take place the same as though the cell 15 were not present resulting in the release of a giant pulse.

Upon cessation of the optical pumping pulse of light into the laser and cessation therefore of the giant pulse a short time later, the cell will return to its normal opaque condition as indicated by the line 24.

If the pumping light pulse is of a longer duration, the laser may again build up an inverted population level and effect another, and perhaps several, giant pulses during a single pumping pulse, the cell being automatically responsive to the incident light as described for alternately inhibiting and permitting the laser action and thus provide the giant pulses.

If the concentration of the polymethine dye in the cell 15 is decreased, less incident light is necessary to convert the condition of the cell from opaque to transparent and thus for a given light pump pulse width, more giant pulses for each light pump may be produced. In fact, as the concentration is decreased even further, the number of giant pulses increases in repetition frequency until a point is reached at which only ordinary laser action occurs.

The value of the dye concentration and the path length of the optical cavity may be chosen, depending upon the laser crystal gain and the cavity Q, to give cell length times absorption coefficient values between .01 and 100.

Different members of the cyanine polymethine dye family may be chosen to absorb at specific wave lengths desired. Accordingly, the scope and spirit of this invention is not meant to be limited to the particular embodiment set forth.

What is claimed is:

1. A laser device including an optical cavity for generating by stimulated emission a monochromatic beam of light of wave length within the range of 7000 A. to 10,800 A.; and an optical control means adapted to be positioned in said optical cavity, said optical control means comprising: a solution of 3,3'-diethyl-9,11,15,17-dineopentylenethia-pentacarbocyanine iodide dissolved in quinoline, said solution having molecules exhibiting a high absorption cross section at wave lengths within said range, the absorption characteristics of said molecules being changed in response to incident light of said wave lengths within said range effecting a transference of said molecules from first to second energy levels, said solution changing from a substantially opaque condition to a substantially transparent condition when said molecules are transferred to said second energy level, cessation of said incident light resulting in said molecules returning to said first energy level to render said solution substantially opaque.

2. A giant pulse laser device for producing a high peak power pulse of radiation comprising, in combination: a neodymium doped laser material; optical pumping means coupled to said material for effecting an inverted population state of neodymium ions in said material between given energy levels; regenerative means exhibiting high reflectance optically coupled to opposite end portions of said laser material to provide an optical cavity for stimulated emission of wave lengths in the range of 7000 and 10,800 A.; and optical control means comprising a dye solution of given concentration made up of 3,3'-diethyl-9,11;15,17-dineopentylene-thia-pentacarbocyanine iodide in a solvent, said dye solution having molecules exhibiting a high absorption cross section at wave lengths within said range positioned in said optical cavity and automatically responsive to an initial stimulated emission of radiation from said laser material to change from a substantially opaque condition to a substantially transparent condition to release said high peak power pulse of radiation, and then back to a substantially opaque condition upon cessation of said peak power pulse.

3. A laser device according to claim 2, in which said solvent is a derivative of quinoline.

4. A laser device according to claim 2, in which said solvent is quinoline.

References Cited

UNITED STATES PATENTS 2,734,900   2/1956   Heseltine _____ 350—160
3,289,099   11/1966   Masters _____ 331—94.5

OTHER REFERENCES

Sorokin P. Amplifier Chain Using Phthalocyanine Dye, IBM Tech. Discl. Bull., vol. 7, No. 3, August 1964, p. 230.

Kafalas et al., J. Appl. Phys., vol. 35, No. 8, August 1964, pp. 2349–50.

Soffer, J. Appl. Phys., vol. 35, No. 8, August 1964, p. 2551.

Sorokin et al., IBM Jour. of Res. & Develop., vol. 8, No. 2, pp. 182–184, April 1964.

JEWELL H. PEDERSEN, Primary Examiner

E. BAUER, Assistant Examiner

U.S. Cl. X.R.

260—240.5; 350—160